United States Patent
Maura et al.

(10) Patent No.: US 7,253,375 B2
(45) Date of Patent: Aug. 7, 2007

(54) COMPONENTS OF THERMOSTATIC UNITS AND LASER WELDING METHOD FOR PRODUCING THE COMPONENTS

(75) Inventors: Massimo Maura, Ceccano (IT); Federico Gamba, Bergamo (IT)

(73) Assignee: ABB Service S.r.l. (IT)

( * ) Notice: Subject to any disclaimer, the term of this patent is extended or adjusted under 35 U.S.C. 154(b) by 0 days.

(21) Appl. No.: 10/500,367

(22) PCT Filed: Dec. 17, 2002

(86) PCT No.: PCT/EP02/14404

§ 371 (c)(1),
(2), (4) Date: Jun. 28, 2004

(87) PCT Pub. No.: WO03/056593

PCT Pub. Date: Jul. 10, 2003

(65) Prior Publication Data

US 2005/0011869 A1 Jan. 20, 2005

(30) Foreign Application Priority Data

Dec. 28, 2001 (IT) .......................... MI2001A2836

(51) Int. Cl.
  *B23K 26/28* (2006.01)
  *H01H 71/16* (2006.01)
(52) U.S. Cl. .................................. 219/121.64; 337/85
(58) Field of Classification Search ........... 219/121.64; 337/85
See application file for complete search history.

(56) References Cited

U.S. PATENT DOCUMENTS 3,648,014 A * 3/1972 Bennett ...................... 219/118

(Continued)

FOREIGN PATENT DOCUMENTS

EP 0 327 320 A 8/1989

(Continued)

OTHER PUBLICATIONS

Stein(editor), 1982, The Random House College Dictionary, Random House, Inc., Revised edition, pp. 472-473.*

(Continued)

*Primary Examiner*—Geoffrey S. Evans
(74) *Attorney, Agent, or Firm*—Connolly Bove Lodge & Hutz LLP

(57) ABSTRACT

A method for joining components of thermostatic systems and thermal relays for low-voltage circuit breakers, the components being constituted by at least one bimetallic element constituted by a lamina with a first face and a second face and at least one connection element that has a substantially flat end part with a third face and a fourth face, its particularity consisting of the fact that it comprises the steps that consist in:—overlapping and coupling the end part of the first face of the bimetallic element with respect to the third face of the end part of the connection element;—subjecting the end part of the second face of the bimetallic element to the welding action of laser means to provide a weld between the bimetallic element and the connection element.

6 Claims, 2 Drawing Sheets

U.S. PATENT DOCUMENTS

| | | | |
|---|---|---|---|
| 4,013,425 A * | 3/1977 | Muhlberger et al. | 428/619 |
| 4,661,677 A | 4/1987 | La Rocca | |
| 4,873,415 A * | 10/1989 | Johnson et al. | 219/121.64 |
| 5,093,988 A * | 3/1992 | Becker | 219/121.64 |
| 5,268,555 A * | 12/1993 | Jones et al. | 219/121.63 |
| 5,276,298 A | 1/1994 | Jones et al. | |
| 5,317,471 A * | 5/1994 | Izoard et al. | 361/105 |
| 5,389,761 A | 2/1995 | Kresse, Jr. | |
| 5,825,273 A * | 10/1998 | Roger | 337/49 |
| 6,274,843 B1 | 8/2001 | Dabezies et al. | |

FOREIGN PATENT DOCUMENTS

| | | | |
|---|---|---|---|
| JP | 54-116356 A | * | 9/1979 |
| JP | 1-130894 A | * | 5/1989 |
| JP | 2001-68171 A | * | 3/2001 |

OTHER PUBLICATIONS

Patent Abstracts of Japan, vol. 2002, No. 11, Nov. 6, 2002 & JP 2002 197954 A (Alps Electric Co. Ltd.), Jul. 12, 2002.

* cited by examiner

COMPONENTS OF THERMOSTATIC UNITS AND LASER WELDING METHOD FOR PRODUCING THE COMPONENTS

BACKGROUND

The present invention relates to components for thermostatic units (of the kind used in thermostatic systems with a bimetallic element for environments or technical systems or in thermal protection relays for low-voltage circuit breakers), particularly to bimetallic elements and their connections to other components of said thermostatic units, and to a method for producing them. In particular, the present invention relates to a method for joining the bimetallic elements to other components of the thermostatic units by means of a laser welding process.

In low-voltage circuit breakers in the current art, the bimetallic element can generally be joined to the other components of thermostatic units, for example braids or terminal connection elements of a thermostat or the moving contacts of a circuit breaker, by mechanical coupling or by braze welding.

The mechanical joining of said bimetallic elements is performed traditionally by using rivets, nails, pressure-based systems or similar joining systems. Although this method provides an efficient joining system, it has drawbacks. In particular, electrical conductivity proximate to the contact points is not ideal and can vary among parts. Furthermore, the mechanical joining operation still requires a larger number of parts (for example rivets or nails) than strictly required for the functionality of the thermostatic unit, thus introducing complications in the assembly process and entailing in any case an increase in production costs.

As an alternative to mechanical coupling, the bimetallic element and the other components of the thermostatic units can be joined by virtue of conventional braze welding processes. These methods do not entail the drawbacks noted above, but entail other different ones, linked to the considerable application of heat required by this technology. As is known, the application of heat is a critical element in the welding of bimetallic elements, since it can entail structural variations of said bimetallic element. Accordingly, its performance is reduced, and therefore the number of substandard parts increases and in any case the behavior is uneven among parts.

It is evident, from what has been described above, that the current art needs to have components of thermostatic units that have a uniform behavior and can be manufactured efficiently. It is also evident that the current art needs to have an efficient method for joining components of thermostatic systems and thermal relays for low-voltage circuit breakers and particularly for joining bimetallic elements to the other components of the corresponding thermostatic units.

The aim of the present invention is to provide components of thermostatic units that can be manufactured efficiently and have a uniform behavior.

SUMMARY

Within the scope of this aim, an object of the present invention is to provide a method for joining components of thermostatic units, and particularly bimetallic elements to the other components of thermostatic systems and thermal relays for low-voltage circuit breakers that does not entail metallic joining systems.

Another object of the present invention is to provide a method for joining components of thermostatic units and particularly bimetallic elements to the other components of thermostatic systems and thermal relays for low-voltage circuit breakers that does not entail scarcely controllable heat application systems.

Another object of the present invention is to provide a method for joining components of thermostatic units and particularly bimetallic elements to the other components of thermostatic systems and thermal relays for low-voltage circuit breakers that does not determine structural variations in said bimetallic element.

Another object of the present invention is to provide a method for joining components of thermostatic systems and thermal relays for low-voltage circuit breakers and particularly bimetallic elements to the other components of thermostatic systems and thermal relays for low-voltage circuit breakers that ensures mass reproducibility.

Another object of the present invention is to provide a method for joining components of thermostatic systems and thermal relays for low-voltage circuit breakers and particularly bimetallic elements to the other components of thermostatic systems and thermal relays for low-voltage circuit breakers that has a modest cost and is economically competitive.

This aim, these objects and others that will become better apparent hereinafter are achieved by means of a method for joining components of thermostatic units, said components being constituted by at least one bimetallic element constituted by a lamina with a first face and a second face and at least one connection element that has a substantially flat end part with a third face and a fourth face, characterized in that it comprises the steps that consist in:

overlapping and coupling the end part of the first face of said bimetallic element with respect to the third face of the end part of said connection element;

subjecting the end part of the second face of said bimetallic element to the welding action of laser means to provide a weld between said bimetallic element and said connection element.

It has been found in fact that by using a laser welding system and by working on one face of the bimetallic element according to the method of the present invention, a joint is provided between the bimetallic element and the connection element that does not have the drawbacks of the known art, since the mechanical coupling means are avoided and there is no application of heat that is critical for the bimetallic element.

Further characteristics and advantages of the method according to the present invention will become better apparent hereinafter with reference to the description given hereafter and to the accompanying drawings, given merely by way of non-limiting examples and wherein the only figures are schematic views of a system for welding components of thermostatic units provided according to the invention.

DETAILED DESCRIPTION

Figure 1:
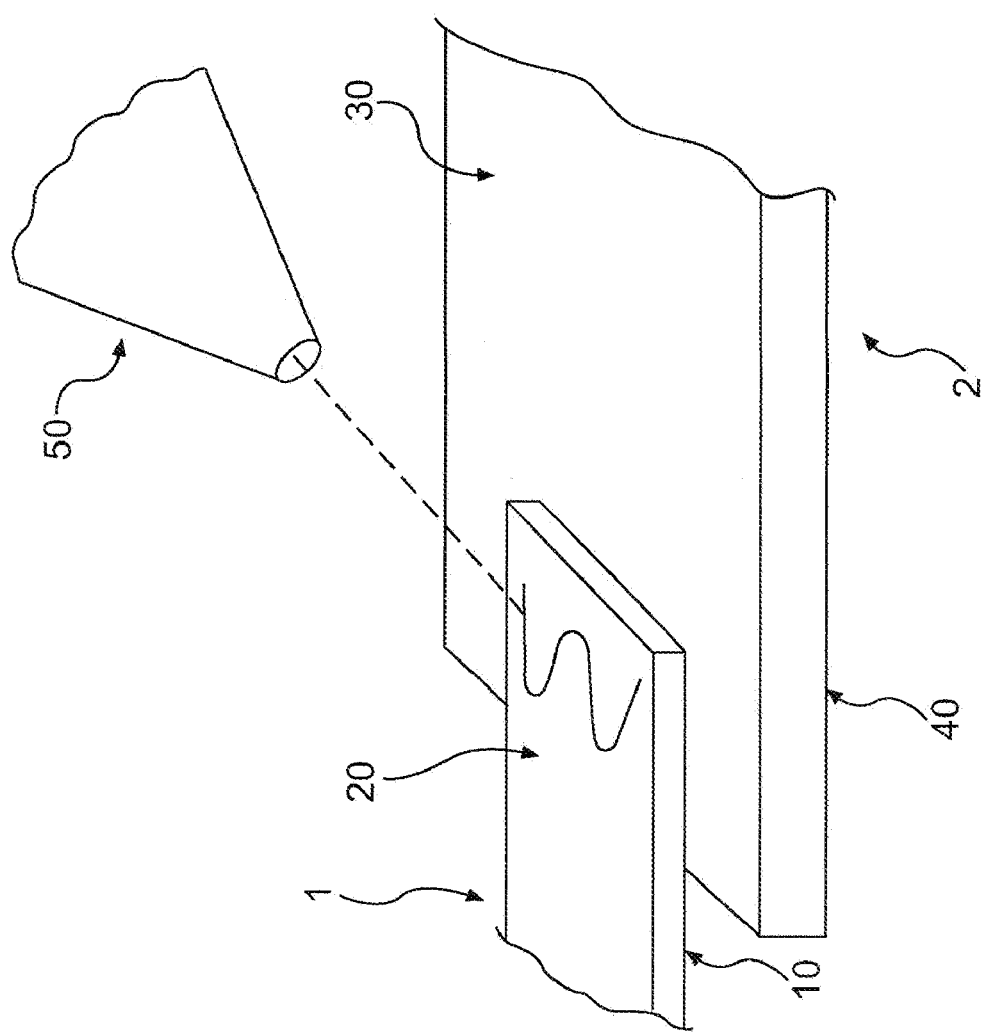
FIG. 1 is a schematic view of a system for welding components of thermostatic units according to one embodiment.

In the accompanying FIG 1, the bimetallic element is designated by the reference numeral 1. Said element is constituted by a lamina with a first face 10 and a second face 20. A connection element, for example the connection of a thermostatic system or relay, is designated by the reference numeral 2. The connection element 2 has a flat end part with a third face 30 and a fourth face 40. The end part of the first face 10 of the bimetallic element is superimposed and coupled to the third face 30 of the end part of the connection element. The end part of the second face 20 of the bimetallic element is subjected to the welding action of laser means 50, so as to provide a weld between the bimetallic element and the said connection element.

Preferably, in the method according to the invention the laser weld is not a spot weld but a continuous weld. For this purpose, the laser means 50 scan the second face 20 of the bimetallic element according to a predefined path. It is evident to the person skilled in the art that said scan can be performed by virtue of a relative movement of the laser means with respect to the components to be welded during the welding operation. In practice, said relative movement can be performed by keeping the components to be welded motionless and moving the laser means, or by keeping the laser means motionless and moving the components to be welded, or by moving both.

Preferably, said scan according to a preset path follows a curved profile, as shown in the figure. As an alternative, however, it is possible to perform said scan along mixed and even discontinuous broken lines (curved and straight portions). Said lines can also be replicated in multiple regions of the face to be welded for example in a substantially parallel manner.

The speed, power, angle of incidence, frequency, amplitude and other physical characteristics of the scanning beam can be chosen and modulated according to the characteristics of the elements to be welded, such as for example their chemical nature or their thickness.

Although it is possible to use laser means of a different type, it is highly preferable to use a solid-state laser, for example a Nd-crystal laser. In this case also, the characteristics of use of the laser, such as for example the frequency, power and angle of incidence, can be chosen and modulated as a function of the characteristics of the elements to be welded and of the results to be obtained.

It has been found in practice that by using the method according to the invention it is possible to weld the bimetallic element to various components of thermostatic systems and thermal relays for low-voltage circuit breakers. In particular, it has been found that it is possible to weld the bimetallic element to rigid connections and also to connecting braids.

Figure 2:
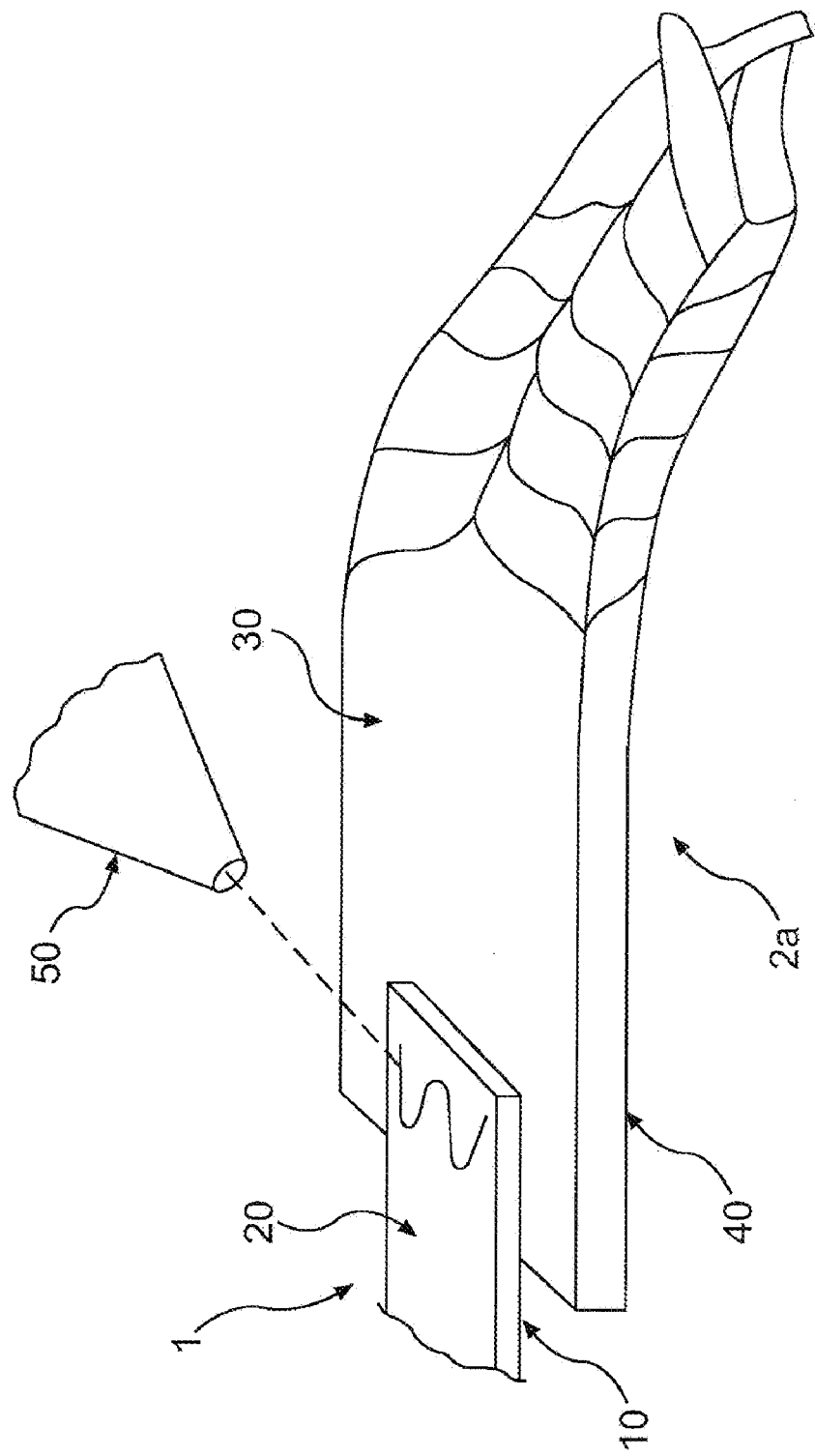
FIG. 2 is a schematic view of a system for welding components of thermostatic units according to another embodiment.

In this last case, the end part of the connecting braids must be machined and shaped appropriately so as to allow coupling to one face of the bimetallic element and its welding thereto. FIG. 2 (in which reference numerals repeated from FIG. 1 indicate similar features), illustrates an embodiment in which a connection element 2a is a connecting braid.

The method according to the invention solves the problems of the known art and has many advantages over it.

In particular, it is not necessary to use mechanical connecting elements, thus reducing the number of parts to those strictly necessary for the functionality of the circuit breaker. The assembly operations, moreover, are simplified, consequently saving on production times and costs.

Moreover, the use of laser means allows to avoid applications of heat that would be critical and damaging for the bimetallic element. In general, the efficiency and reproducibility from part to part of the method according to the invention are greater than those of the methods of the known art, thus reducing the number of rejects and substandard parts and increasing the overall economy of the production process.

With the method according to the invention it is therefore possible to obtain components of thermostatic systems and thermal relays for low-voltage circuit breakers that have improved characteristics with respect to the components of the known art. These components, like the devices (for example circuit breakers) that comprise them, constitute an additional aspect of the present invention.

In practice it has been found that the method according to the invention and the components of low-voltage circuit breakers obtained therewith fully achieve the intended aim and objects. The method thus conceived is susceptible of numerous modifications and variations.

All the details may furthermore be replaced with other technically equivalent elements.

The invention claimed is:

1. A method for joining components of thermostatic systems and thermal relays for low-voltage circuit breakers, said components being constituted by at least one bimetallic element constituted by a lamina with a first face and a second face and at least one connection element comprising a connecting braid that has a substantially flat end part with a third face and a fourth face, wherein the method comprises:

overlapping and coupling the end part of the first face of said bimetallic element with respect to the third face of the end part of said connection element; and subjecting the end part of the second face of said bimetallic element to the welding action of laser means to provide a weld between said bimetallic element and said at least one connection element, wherein:

said laser means scan the second face along a predefined path that follows a curved profile; and said curved profile is designed entirely within said second face and has no intersecting portions.

2. The method for joining components of low-voltage circuit breakers according to claim 1, wherein said laser means are constituted by a solid-state laser.

3. The method for joining components of low-voltage circuit breakers according to claim 2, wherein the at least one connection element comprises a circuit breaker protection relay connection.

4. The method for joining components of low-voltage circuit breakers according to claim 1, wherein the at least one connection element comprises a circuit breaker protection relay connection.

5. Components of low-voltage circuit breakers obtained with a method according to claim 1.

6. A low-voltage circuit breaker, comprising one or more components according to claim 5.

* * * * *